(12) United States Patent
Pangburn

(10) Patent No.: US 7,152,226 B2
(45) Date of Patent: Dec. 19, 2006

(54) FLEXIBLE HORIZONTAL STACK DISPLAY AND EDITOR

(76) Inventor: James Pangburn, 3168 Vinifera Dr., San Jose, CA (US) 95135

( * ) Notice: Subject to any disclaimer, the term of this patent is extended or adjusted under 35 U.S.C. 154(b) by 774 days.

(21) Appl. No.: 09/946,754

(22) Filed: Sep. 4, 2001

(65) Prior Publication Data

US 2003/0046664 A1 Mar. 6, 2003

(51) Int. Cl.
G06F 9/44 (2006.01)
G06F 11/00 (2006.01)
G06F 17/00 (2006.01)

(52) U.S. Cl. ............... 717/125; 717/127; 717/131; 715/705; 714/38

(58) Field of Classification Search ........ 717/124–160; 715/705; 714/38
See application file for complete search history.

(56) References Cited

U.S. PATENT DOCUMENTS

| | | | | |
|---|---|---|---|---|
| 5,410,648 A | * | 4/1995 | Pazel | ............... 717/124 |
| 5,812,850 A | * | 9/1998 | Wimble | ............... 717/131 |
| 5,926,638 A | * | 7/1999 | Inoue | ............... 717/125 |
| 5,987,248 A | * | 11/1999 | Murayama et al. | ......... 717/125 |
| 6,003,143 A | | 12/1999 | Kim et al. | |
| 6,026,362 A | * | 2/2000 | Kim et al. | ............... 705/1 |
| 6,055,369 A | * | 4/2000 | Sawahata et al. | ........... 717/109 |
| 6,077,312 A | | 6/2000 | Bates et al. | |
| 6,282,701 B1 | | 8/2001 | Wygodny et al. | |
| 6,748,583 B1 | * | 6/2004 | Aizenbud-Reshef et al. | ..... 717/127 |

* cited by examiner

*Primary Examiner*—Tuan Dam
*Assistant Examiner*—Chuck Kendall
(74) *Attorney, Agent, or Firm*—Klarquist Sparkman LLP

(57) ABSTRACT

A method and system for debugging a computer program are described. In one embodiment, information pertaining to a first function executed within the computer program is presented in a first sub-window of a stack window. Further, information pertaining to a second function executed within the computer program is presented in a second sub-window of the stack window. The second sub-window is positioned next to the first sub-window to provide a horizontal arrangement of the sub-windows within the stack window.

31 Claims, 16 Drawing Sheets

FLEXIBLE HORIZONTAL STACK DISPLAY AND EDITOR

FIELD OF THE INVENTION

The present invention relates to tools for assisting software developers during a debugging process and more specifically to a debugging tool using a horizontal stack display and editor.

BACKGROUND OF THE INVENTION

"Debuggers" are software diagnostic tools that provide users with mechanisms for viewing and controlling the execution of programs (including the program states and the values of variables) for the purpose of helping the user identify errors in the program code. Most software programs are written today in so-called third generation "high-level" languages which a compiler translates to machine instructions. Programs written in third generation languages are organized into functions (also referred to as procedures or routines). Functions are defined to perform specific processing tasks. They are composed of one or more lines of source code and may have their own local variables that maintain state information that is unique to the function. Functions may call other functions to perform specific tasks. When this occurs, execution transfers to the "called" function and will return to the "calling" function when the called function has completed the requested task. The execution state of the program is maintained on a "call stack," located within computer memory, which records the current execution location in each function that has been called. When a function is called, the current execution location in the calling function is recorded in the stack. When the called function completes, this location is removed from the stack and execution resumes at the saved location in the calling function.

Conventional debuggers display a list of active functions and stack data associated with each active function (e.g., values of attributes and local variables) to allow the user to identify errors in the program code. However, due to the manner in which this information is presented, the user cannot efficiently utilize it during the debugging process. Typically, the list of active functions is displayed in a top-down or a bottom-up fashion in a separate call stack window positioned on top of a source code window. FIG. 1 illustrates an exemplary call stack display, according to a prior art embodiment.

Referring to FIG. 1, a list of active functions associated with a line 104 of the program code is displayed in a call stack window 102 presented on top of a source code window 106. As shown in FIG. 1, functions are presented in call stack window 102 in a top-down fashion in which the program's top-most function (main) is at the very top and subsequent child functions (B, I, M, I and J) are indented to the right and spaced lower in window 102. When the user needs to see the values of attributes and local variables associated with a particular function, the user can request this data by double-clicking on the area corresponding to the function. In response, a new window containing the requested data will be displayed on the screen, occupying a portion of window 102 and/or a portion of window 100. Typically, during debugging, the user needs to view the call stack data of multiple functions. Often, the user also needs to compare data associated with different functions. Each time the user wishes to request the data of a new function, the user has to return to window 102 and double-click on the area corresponding to the desired function, causing one or more windows to pop up on top of the existing windows. Multiple windows generated during debugging distract the user's attention, slow down the debugging process, and make the comparison of data associated with different functions inconvenient to the user.

SUMMARY OF THE INVENTION

A method and system for debugging a computer program are described. In one embodiment, information pertaining to a first function executed within the computer program is presented in a first sub-window of a stack window. Further, information pertaining to a second function executed within the computer program is presented in a second sub-window of the stack window. The second sub-window is positioned next to the first sub-window to provide a horizontal arrangement of the sub-windows within the stack window. In one embodiment, the size of any sub-window can be changed based on a user interaction with a cursor control device. Alternatively, any sub-window can be closed based on the user interaction with the cursor control device. In one embodiment, the information pertaining to each function can be updated using data provided by the user.

Other features of the present invention will be apparent from the accompanying drawings and from the detailed description which follows.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
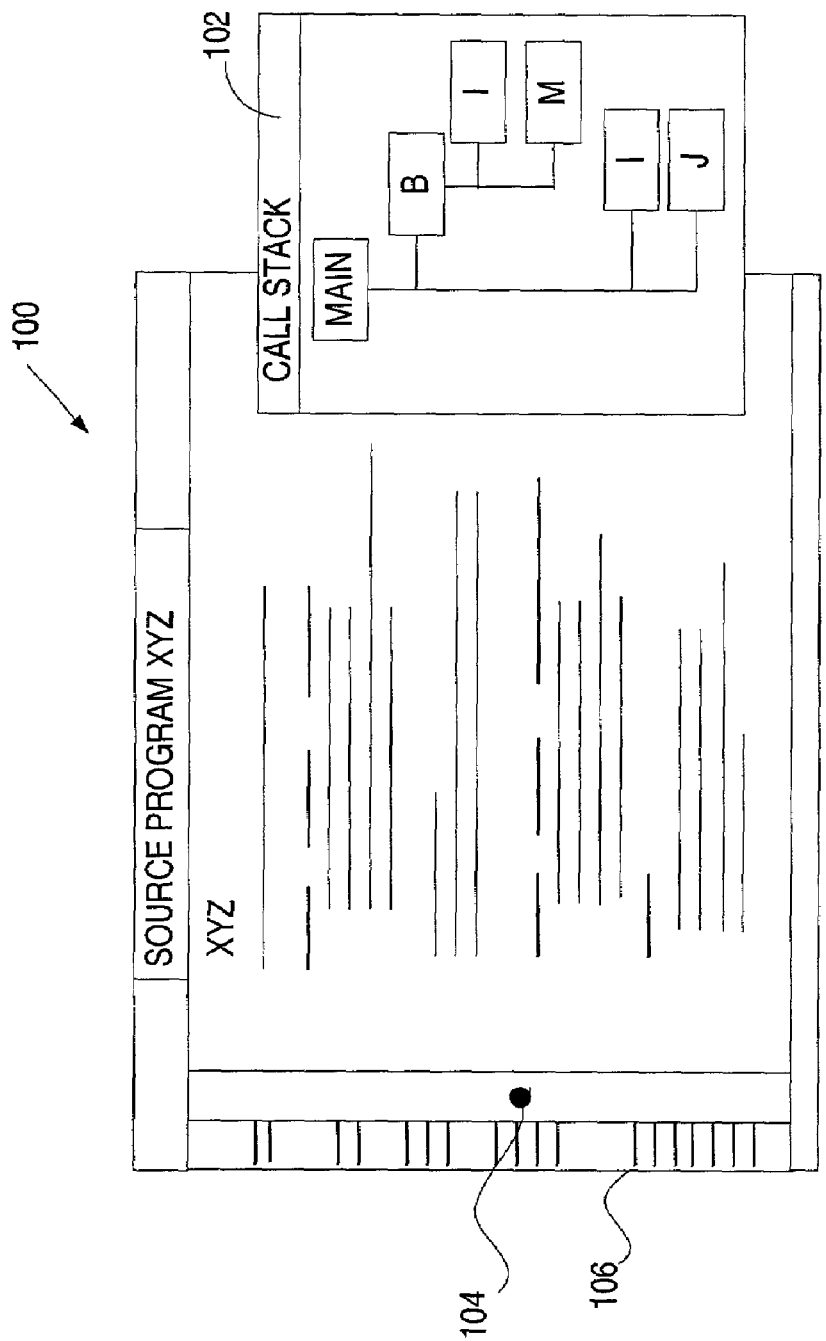
FIG. 1 illustrates an exemplary call stack display, according to a prior art embodiment.

A method and system for debugging a computer program are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
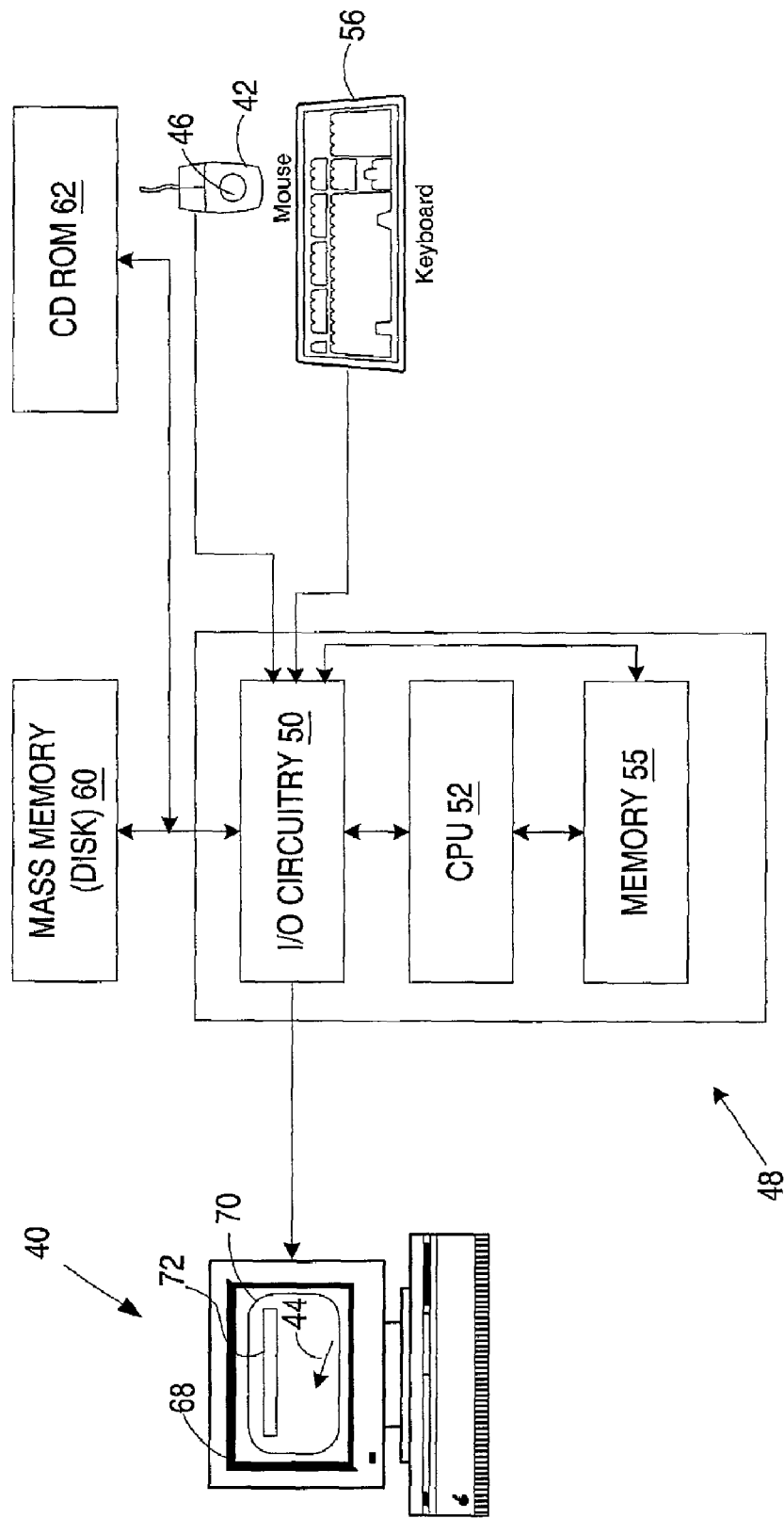
FIG. 2 is a block diagram of a digital processing system in which debugging functionality may be provided, in accordance with one embodiment of the present invention.

FIG. 2 is a block diagram of a digital processing system in which debugging functionality may be provided, in accordance with one embodiment of the present invention. The digital processing system includes a display means 40, such as a CRT monitor or a liquid crystal display (LCD), a plasma display, or other type of display device. The digital processing system further includes a cursor control device 42, such as a mouse, a track ball, joy stick, touchpad or other device for selectively positioning a cursor 44 on a display screen 68 of the display 40. Typically, the cursor control device 42 includes a signal generation means, such as a switch 46 (e.g., a mouse button, a mouse wheel, etc.) having a first position and a second position. The user of the digital processing system may use the switch 46 to generate signals directing the system to execute certain commands. As illustrated, the cursor control device 42 is coupled to a computer system 48.

The computer 48 comprises an input/output (I/O) circuit 50 which is used to communicate information in appropriately structured form to and from other portions of the computer 48. In addition, the computer 48 includes a central processing unit (CPU) 52 coupled to the I/O circuit 50 and a memory 55. These elements are those typically found in most general purpose computers, and in fact, computer 48 is intended to be representative of a broad category of data processing devices capable of generating graphic displays.

CPU 52 may represent one or more processors (e.g., microprocessors), and memory 55 may represent the random access memory (RAM) comprising the main storage of computer 48, as well as any supplemental levels of memory, e.g., cache memories, non-volatile or backup memories (e.g., programmable or flash memories), read-only memories, etc. In addition, memory 55 may be considered to include memory storage physically located elsewhere in computer 48, e.g., any cache memory in CPU 52, as well as any storage capacity used as a virtual memory, e.g., as stored on a magnetic mass memory 60, a CD ROM 62, or on another computer coupled to computer 48 via a network. Magnetic mass memory disk 60 is shown coupled to I/O circuit 50 to provide additional storage capability for the computer 48. In addition, CD ROM 62 is further coupled to the I/O circuit 50 for additional storage capacity. It will be appreciated that additional devices may be coupled to the computer 48 for storing data, such as magnetic tape drives, as well as networks, which are in turn coupled to other data processing systems.

Also shown in FIG. 2 is a keyboard 56 to input data and commands into the computer 48, as is well known in the art. As illustrated in FIG. 2, the display 40 includes the display screen 68 in which a window 70 is displayed. As is well known in the art, the window 70 may be in the form of a rectangle or other well known shape, and may include a menu bar 72 disposed horizontally across the length of the window. As is well known, the movement of the cursor control device 42 may be translated by the computer 48 into movement of the cursor 44 on the display screen 70. The system illustrated in FIG. 2 is intended to represent a general digital processing system capable of providing a graphical user interface display. It will be appreciated that the digital processing system represents only one example of a system, which may have many different configurations and architectures, and which may be employed with the present invention. In operation, the window based user interface of the present invention is generated and displayed using software stored in memory 55 and executed by the CPU 52, as is known.

Figure 5:
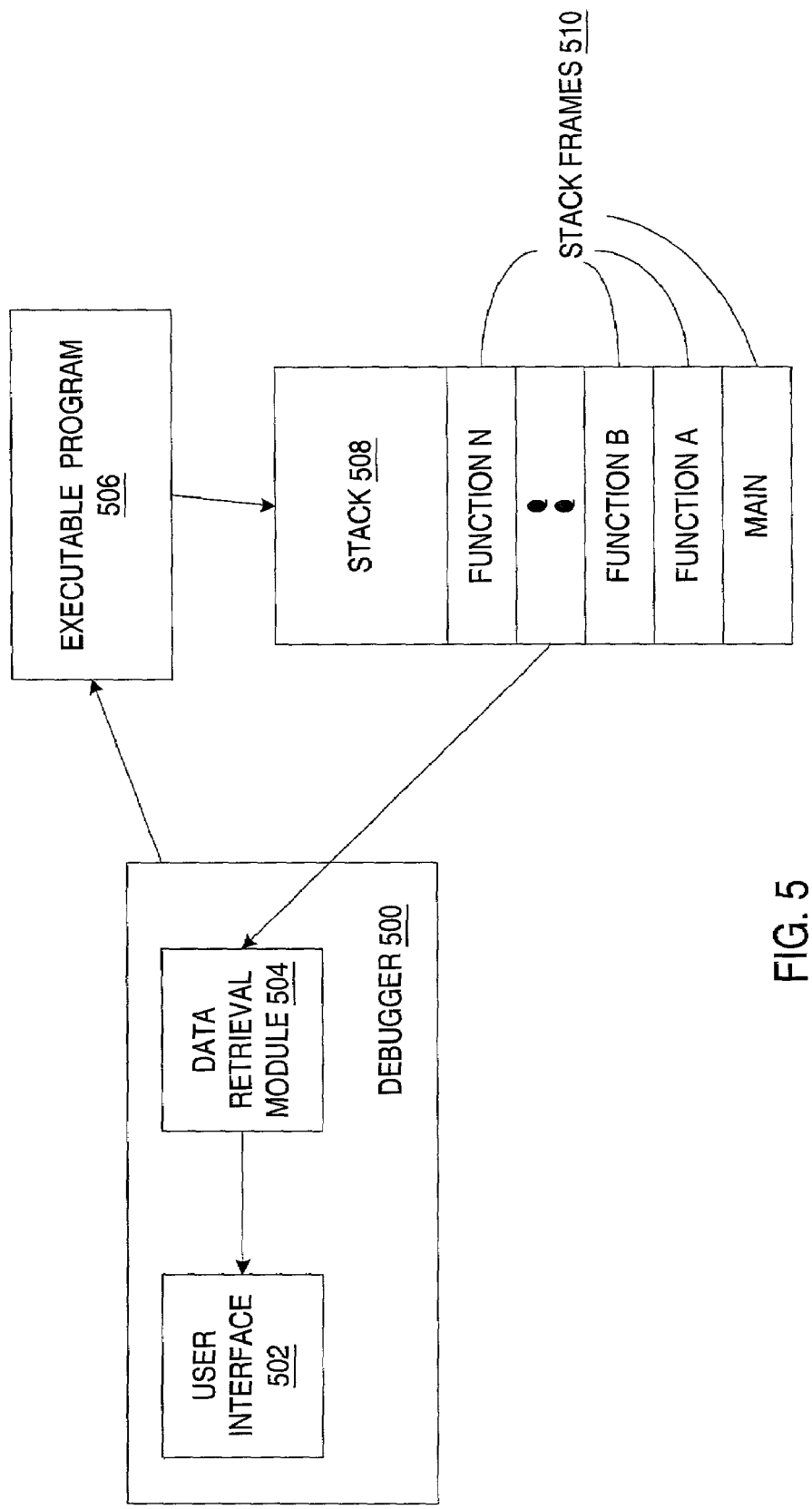
FIG. 5 is a block diagram illustrating one embodiment of a debugger.

FIG. 5 is a block diagram illustrating one embodiment of a debugger 500 operating in the computer 48. Debugger 500 is resident in memory 55 for the purpose of debugging one or more executable computer programs, e.g., executable program 506. A portion of memory 55 is dedicated to storing the register states and local variables associated with each function of program 506 that is currently executing on the computer 48. This portion of memory 55 is typically called a "program call stack" or simply "the stack" 508. As illustrated in FIG. 5, the memory locations associated with information pertaining to each such function are organized into a data structure 510 known as a "stack frame."

In one embodiment, debugger 500 includes a data retrieval module 504 and a user interface module 502. Data retrieval module 504 monitors the execution of program 506 and retrieves stack data associated with a function that is currently executing within program 506 from stack 508. User interface module 502 processes this stack frame data and renders the resulting data representation on the display screen 68. Specifically, user interface module 502 generates a window-based user interface which presents stack frame data of multiple active functions in corresponding sub-windows of a stack window using a horizontal arrangement of sub-windows within the stack window. In one embodiment, the stack window is presented on top of a source code window to allow the user to correlate stack information with the lines of code in the program. Alternatively, the source code may be unavailable. In this case, the stack window may be presented on top of a re-assembled machine code window to allow the user to monitor the execution of the program.

Figure 3:
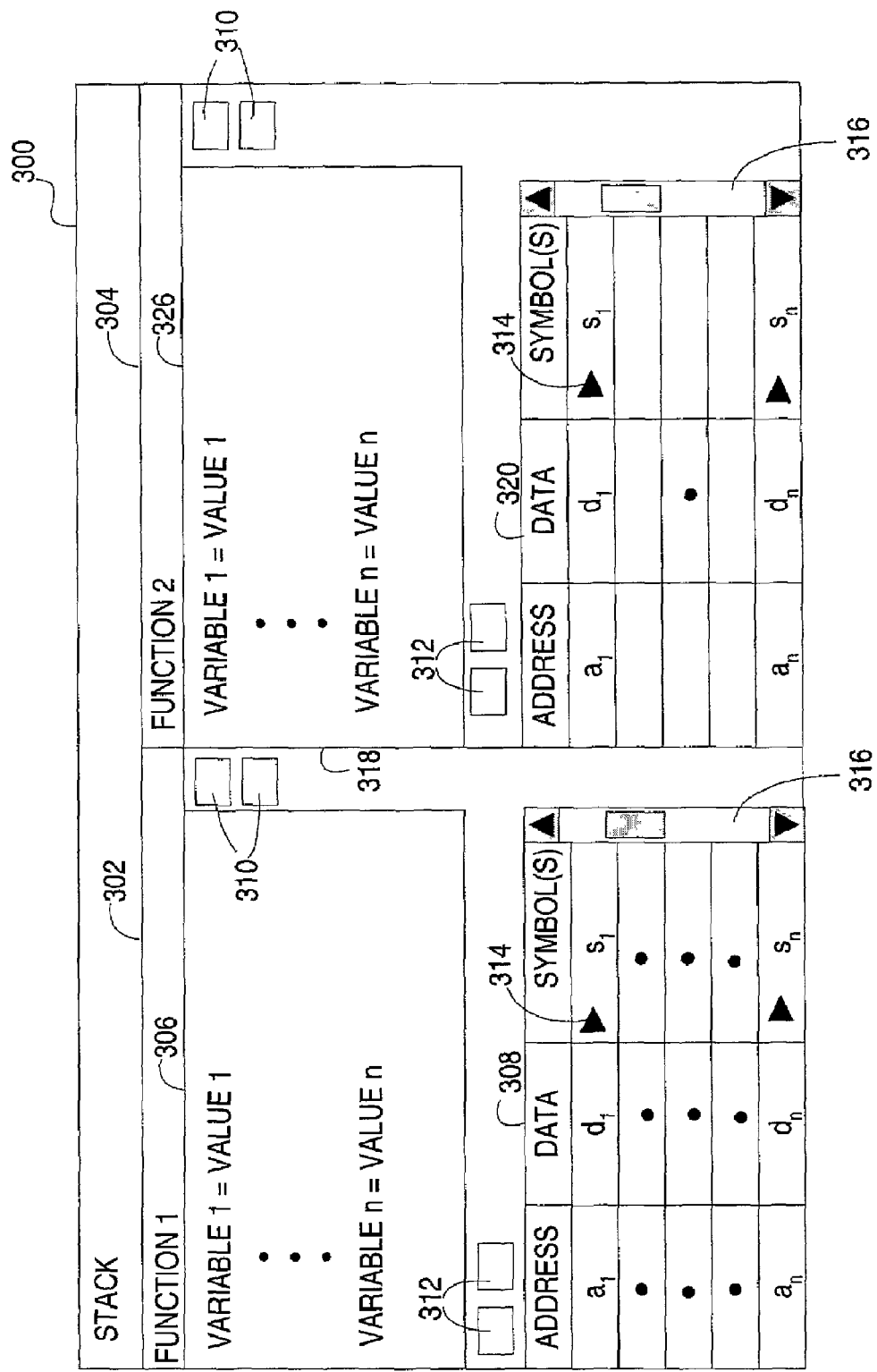
FIGS. 3, 4A and 4B illustrate representations of exemplary user interfaces generated by a debugger, according to one embodiment of the present invention.
Figure 4A:
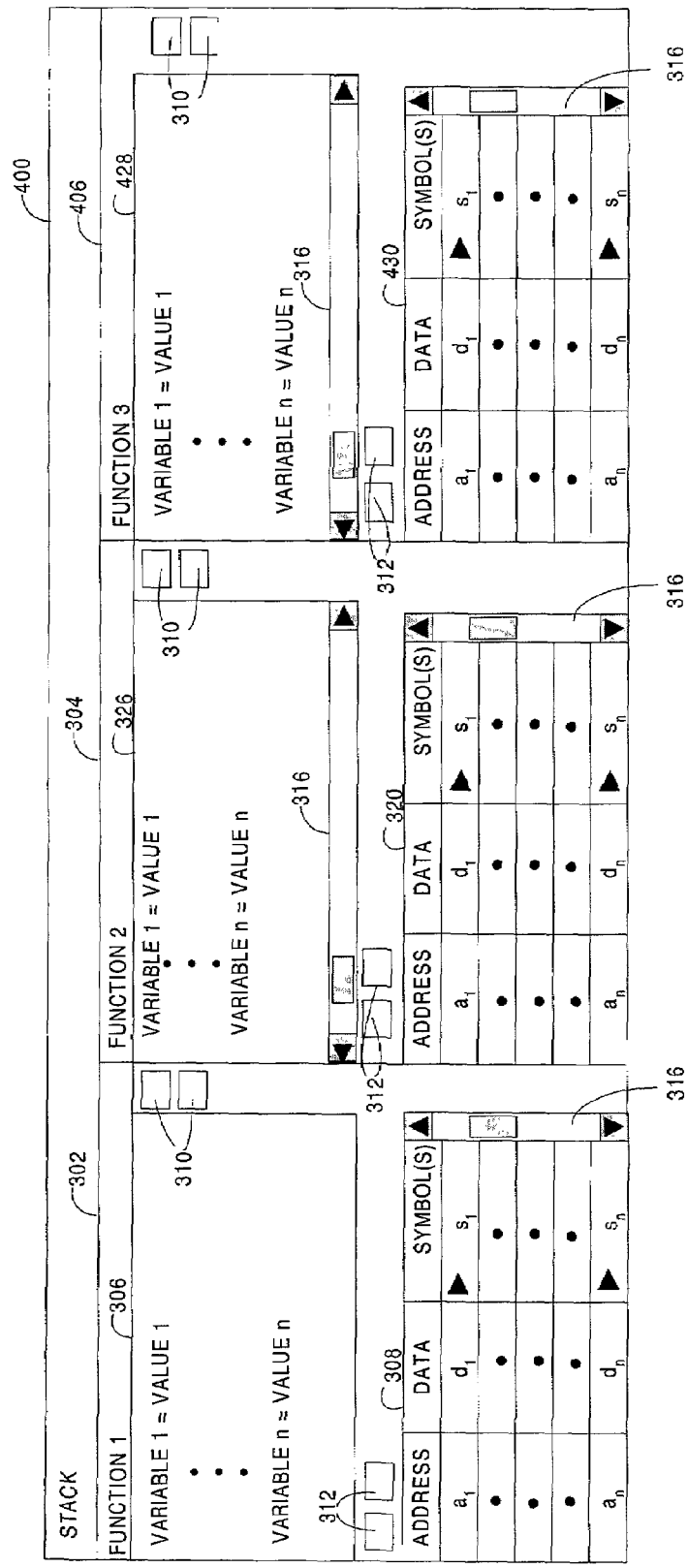
Figure 4B:
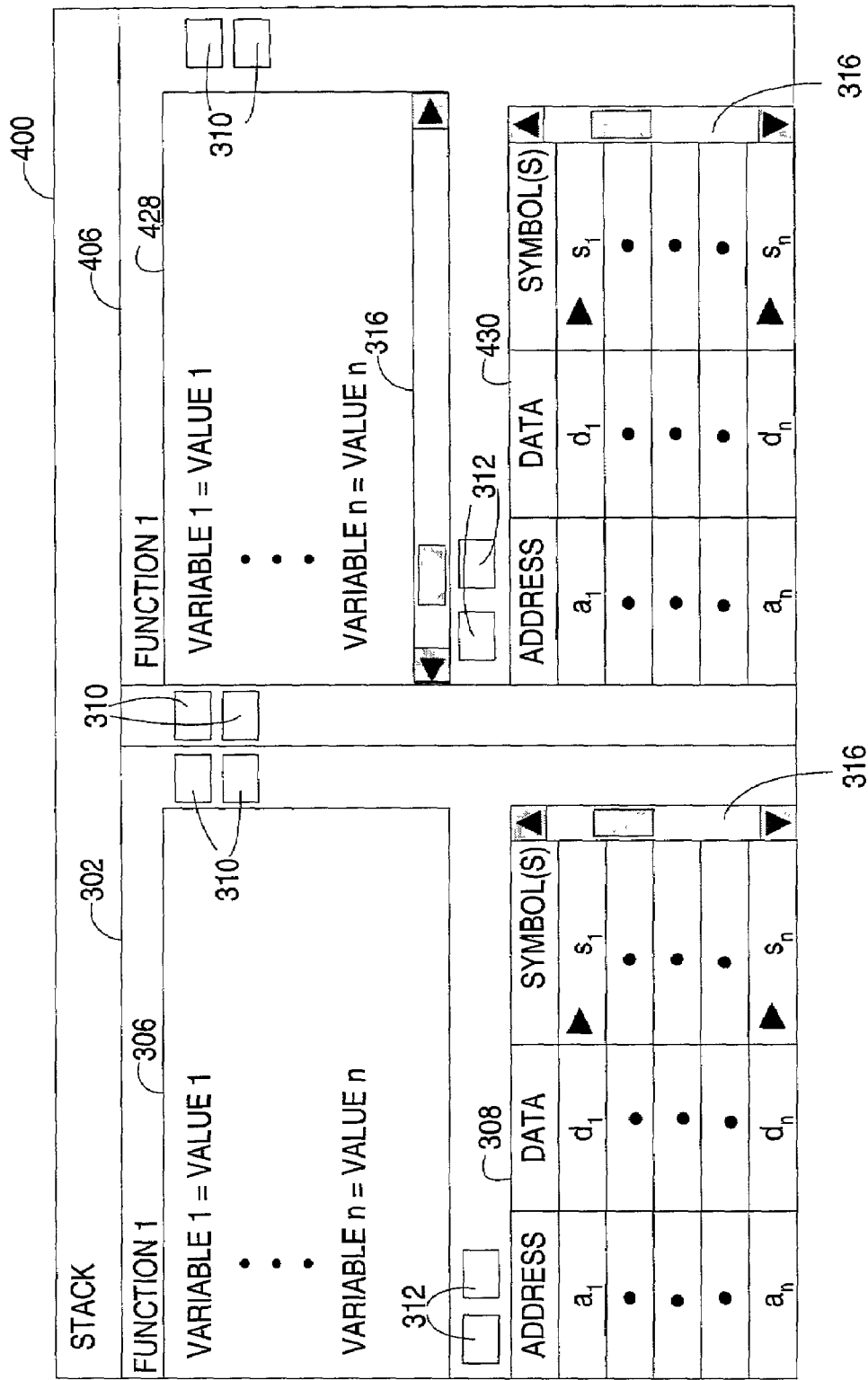

FIGS. 3, 4A and 4B illustrate representations of exemplary user interfaces generated by the debugger 500, according to one embodiment of the present invention. Referring to FIG. 3, stack window 300 includes a sub-window 302 associated with function 1 and a sub-window 304 associated with function 2. Sub-windows 302 and 304 are arranged horizontally within window 300. The size of window 302 or 304 can be adjusted at any time. For example, if function 1 has fewer variables than function 2, the user may want to increase the size of sub-window 2 within the stack window 300 to be able to see all the variables of function 2. In one embodiment, symbols 310 are provided to enable modification of the size of windows 302 and 304. For example, symbols 310 may include two triangles: one triangle may be used to accept the user's command to reduce the size of sub-window 302 or 304 (e.g., by performing the "point and click" method with a cursor control device such as a mouse) and the other triangle may be used to accept the user's command to increase the size of sub-window 302 or 304. Alternatively, the user may request the modification of the window's size by using a line 318, e.g., line 318 can be dragged to the left to reduce the size of sub-window 302, or to the right to increase the size of sub-window 302.

In one embodiment, window 302 or 304 can be completely closed upon receiving a corresponding command from the user. In this embodiment, symbols 310 may include a symbol associated with the closing of the sub-window (e.g., an "x", or a triangle) and a symbol associated with the re-opening of the sub-window (e.g., a rectangle). It should be noted that various other symbols and methods known in the art can be used to adjust the size of sub-windows 302 and 304 and/or to completely close any of these windows.

In one embodiment, each of sub-windows 302 and 304 includes two display areas: a first display area 306 or 326 for displaying high-level stack data and a second display area 308 or 320 for displaying low-level stack data. High-level stack data may identify attributes and variables (e.g., global variables and local variables) associated with a corresponding function and specify values of these attributes and variables during the execution of this function. In one embodiment, if a variable is of a compound type, an indicator (e.g., an icon) is displayed next to the variable to accept the user's command for additional information concerning this variable. Using the indicator, the user may request further information about this variable (e.g., by clicking on an icon preceding the variable). In response, one or more sub-components of the variable will appear below the variable in a tree-like fashion. Alternatively, any other method known in the art can be used to indicate that a variable consists of multiple sub-components and to provide information about these sub-components.

Low-level stack data may include multiple memory locations, data stored at each of these memory locations, and a symbol corresponding to each of these memory locations in the program. In one embodiment, multiple program symbols may correspond to one memory location. The user may request to view each of the multiple symbols. For example, an indicator 314 may be provided to accept the user's command to view the next symbol corresponding to particular location. The low-level stack data may be presented as a table or in any other form.

In one embodiment, the size of each of display areas 306, 308, 320 and 326 is adjustable. For example, if the source code for function 1 is unavailable, the user can only use the low-level stack data during debugging. Accordingly, the user can increase the size of the display area 308 to see a larger portion of the low-level data. The size of the display area can be adjusted using the same methods as those used for adjusting the size of sub-windows 302 and 304. For example, symbols 312 (e.g., two triangles) may be used to accept the user's command to modify the size of the display area. Alternatively, any other method known in the art can be used to modify the size of the display areas. In one embodiment, a scroll bar 316 may be provided for any of the display areas when the size of the display area is not enough to fit the entire low-level or high-level stack data. In one embodiment, a vertical scroll bar (when needed) is provided for display areas 308 and 320 and a horizontal scroll bar (when needed) is provided for display areas 306 and 310.

In one embodiment, any portion of low-level and high-level stack data can be updated. In one embodiment, upon receiving the user's command to update a particular item (e.g., a local variable) displayed in sub-window 302 or 304, the item is highlighted to indicate the transition into an update mode and the user is allowed to replace an existing value with a new value. In one embodiment, an update command is generated when the user interacts with the item using the cursor control device (e.g., by double-clicking the item).

As can be seen in FIG. 3, the horizontal arrangement of sub-windows 302 and 304 within the stack window 300 and the inclusion of low-level and high-level stack data in sub-windows 302 and 304 provide the user with a convenient and efficient way of analyzing the stack data of functions 1 and 2, correlating their stack data and updating any portion of their stack data when needed.

Referring to FIG. 4A, a third sub-window 406 is added to sub-windows 302 and 304. As shown, all three sub-windows are arranged horizontally within a stack window 400. Similarly to sub-windows 302 and 304, sub-window 406 includes a display area 428 for presenting high-level stack data and a sub-window 430 for presenting low-level stack data.

Sub-window 406 is associated with function 3. Function 3 may be called by function 2 or function 1. In one embodiment, sub-window 406 is associated with another instance of function 1 recursively called by function 2 or function 1 itself within the executable program. A recursive call occurs when a function calls itself or another function that is active on the stack. In this case, the user of the debugger 500 may need to correlate stack data associated with two instances of the same function to control the execution of the program (e.g., to verify a correct execution of an "IF" condition within the program). When the correlation of stack data presented in two sub-windows that are not positioned next to each other is needed, one or more sub-windows positioned between the sub-windows being correlated can be closed to simplify the correlation, as illustrated in FIG. 4B.

Referring to FIG. 4B, sub-window 302 is no longer open. Sub-windows 306 and 406 are conveniently positioned next to each other, providing a convenient and efficient way for side-by-side comparison of low-level and high-level stack data associated with two instances of function 1. If the user wishes to re-open window 304, the user can use a corresponding symbol 310 designed to accept a reopen command from the user.

Figure 6:
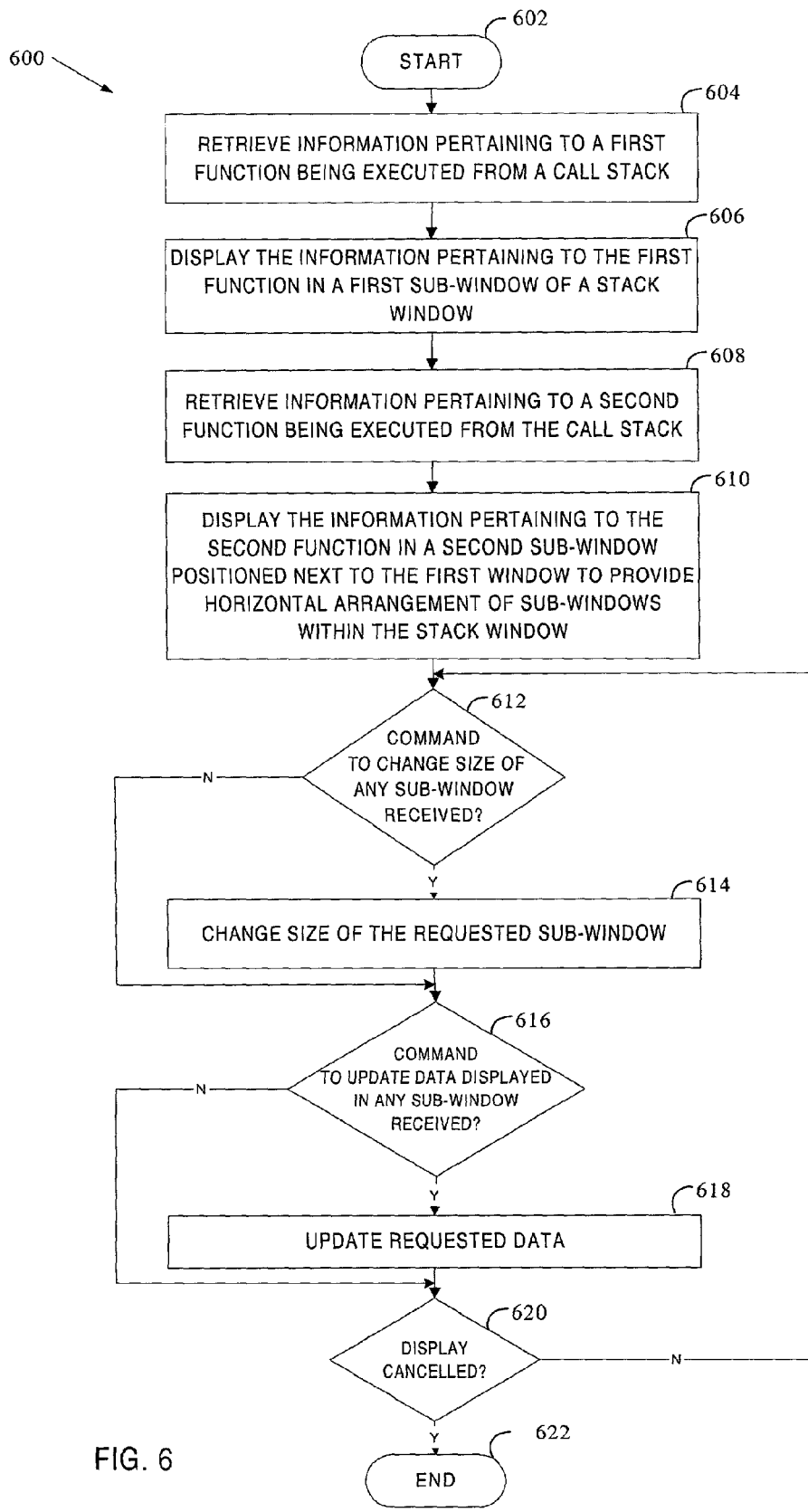
FIG. 6 is a flow diagram of a method for debugging a computer program, according to one embodiment of the present invention.

FIG. 6 is a flow diagram of a method 600 for debugging a computer program, according to one embodiment of the present invention. Method 600 begins with retrieving information pertaining to a first function being executed within a computer program from the stack (processing block 604). At processing block 606, the information pertaining to the first function is displayed in a first sub-window of the stack window. Next, at processing block 608, information pertaining to a second function being executed within the computer program is retrieved from the stack. At processing block 610, the information pertaining to the second function is displayed in a second sub-window of the stack window. The second sub-window is positioned next to the first sub-window to provide a horizontal arrangement of sub-windows within the stack window.

At processing block 612, a determination is made as to whether a command to change the size of any sub-window within the stack window is received from the user. If the determination is positive, the size of the requested sub-window is changed (processing block 614). If the determination is negative and/or after processing block 614 is performed, a further determination is made as to whether a command to update a portion of data displayed in any sub-window is received (processing block 616). If this determination is positive, the requested portion of the stack data is updated (processing block 618). In one embodiment, processing blocks 612 and 616 are performed concurrently. In other embodiments, processing blocks 616–618 are performed before or after processing blocks 612–614.

Processing blocks 612–618 are repeated until the display of stack data is cancelled (processing block 620). The display of stack data can be cancelled by closing the stack window or completing the debugging of the program.

FIGS. 7–15 illustrate representations of exemplary user interfaces generated during a debugging process, according to one embodiment of the present invention.

Figure 7:
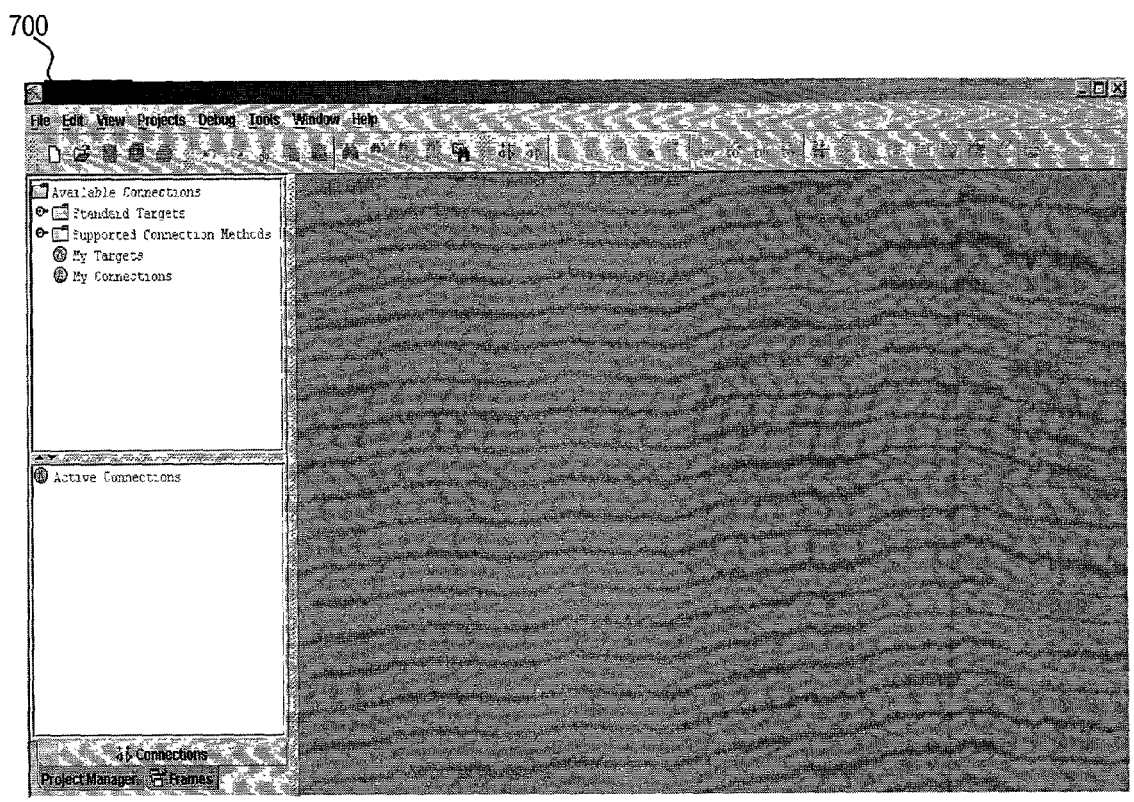
FIGS. 7–15 illustrate representations of exemplary user interfaces generated during a debugging process, according to one embodiment of the present invention.

Referring to FIG. 7, window 700 presents information associated with the beginning of the debugging process. Specifically, window 700 allows the user to request information on standard targets or connection methods supported by this debugger. The user can request this information by double-clicking on a desired field.

Figure 8:
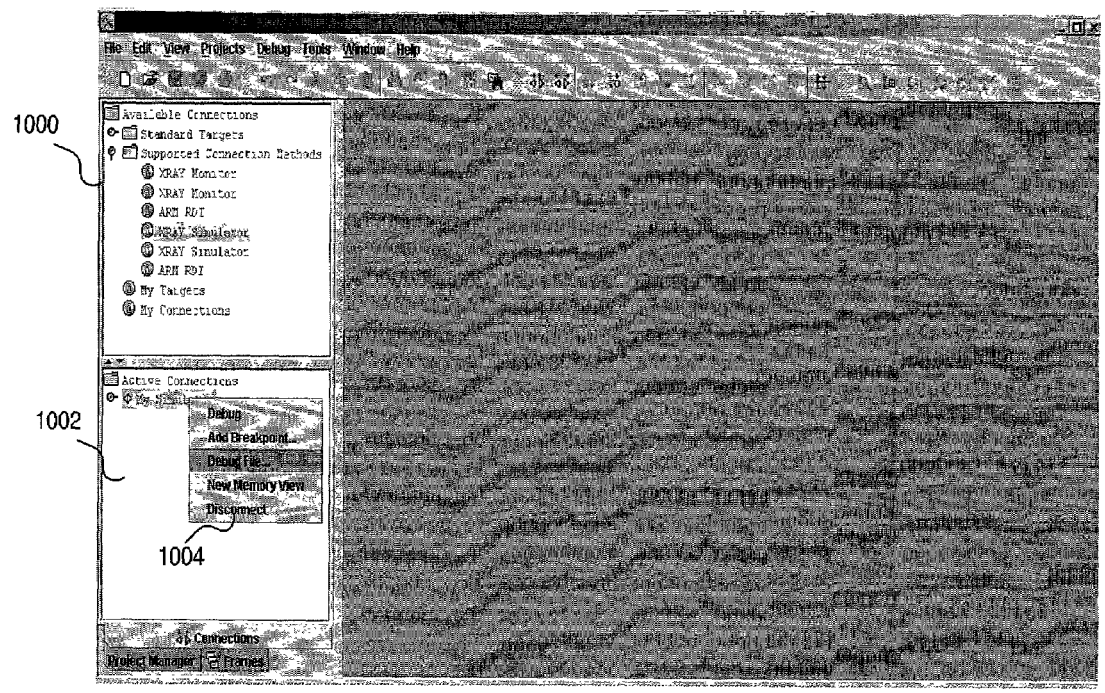

Referring to FIG. 8, window 1000 illustrates the addition of a connection 1002 to the list of active connections. Connection 1002 represents a connection method selected by the user from the list of supported connection methods. Right-clicking on connection 1002 brings up a menu 1004 with all currently available debugging operations. The user can then select a certain debugging operation from the menu 1004.

Figure 9:
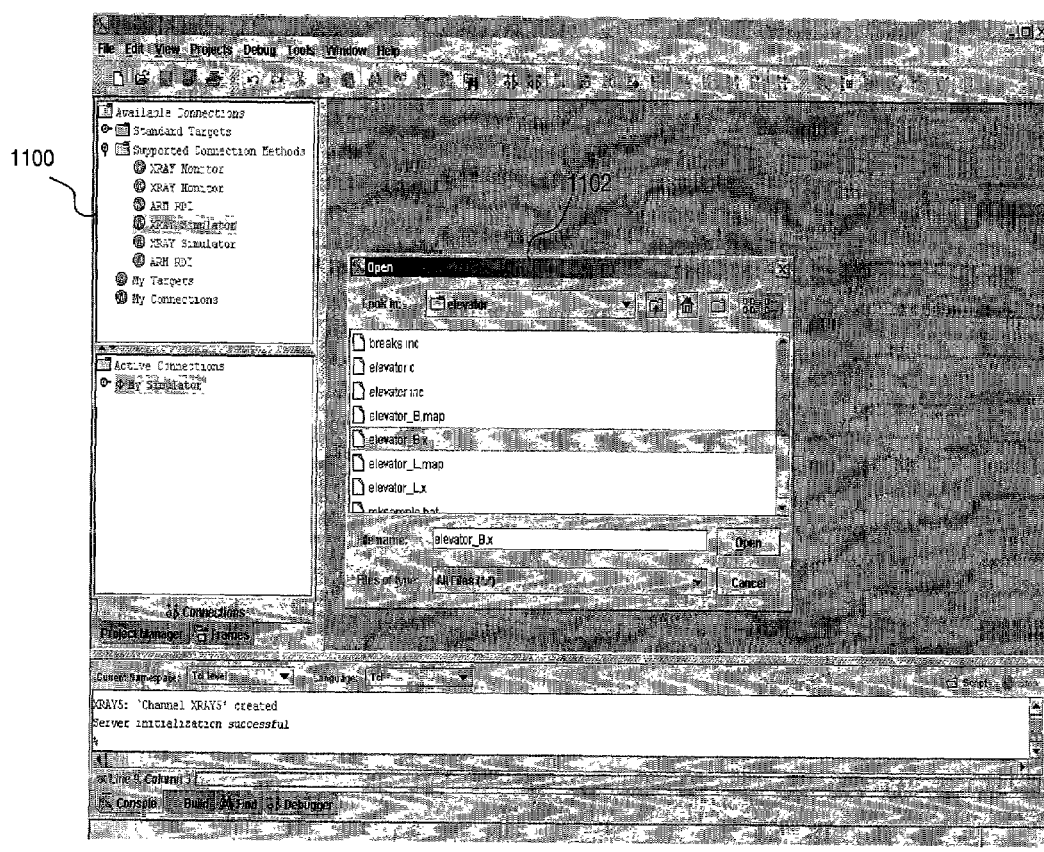
Figure 10:
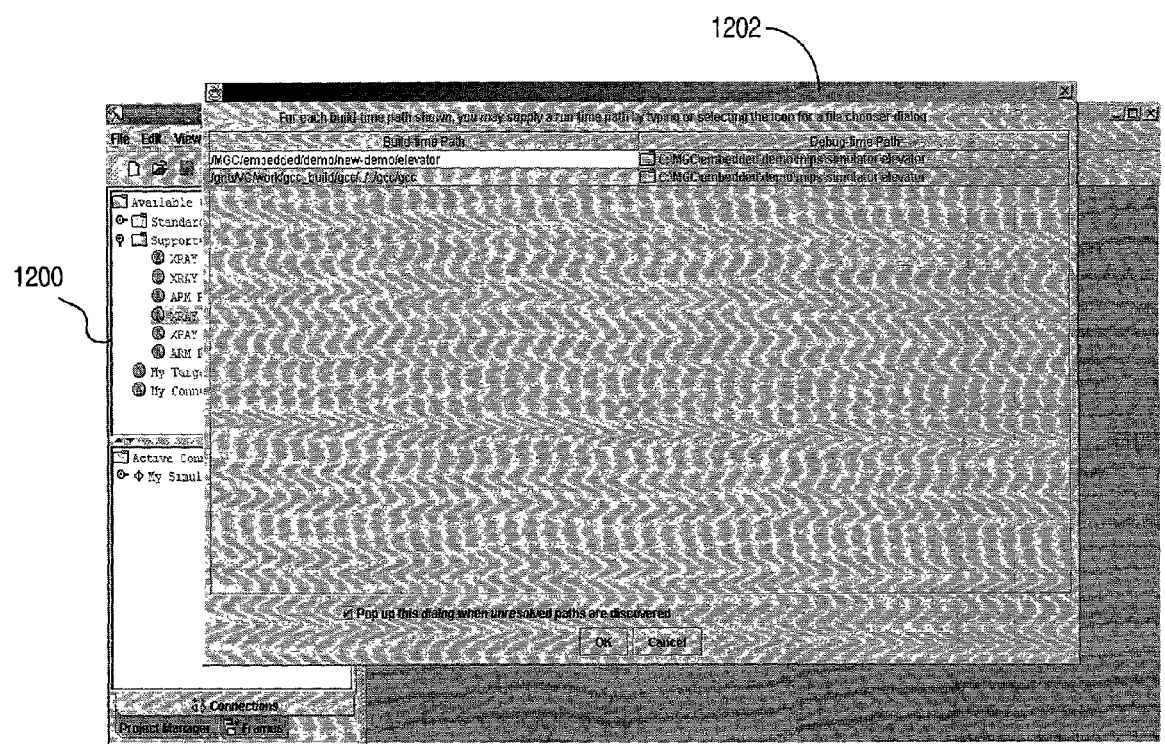

Referring to FIG. 9, window 1102 is generated in response to the user's selection of a "Debug File" operation. Window 1102 provides a list of program files and allows the user to select a program file to debug. If the source code for the selected program file cannot be found on this machine, window 1202 shown in FIG. 10 is generated to facilitate the user's input of a run-time path for the selected program file.

Figure 11:
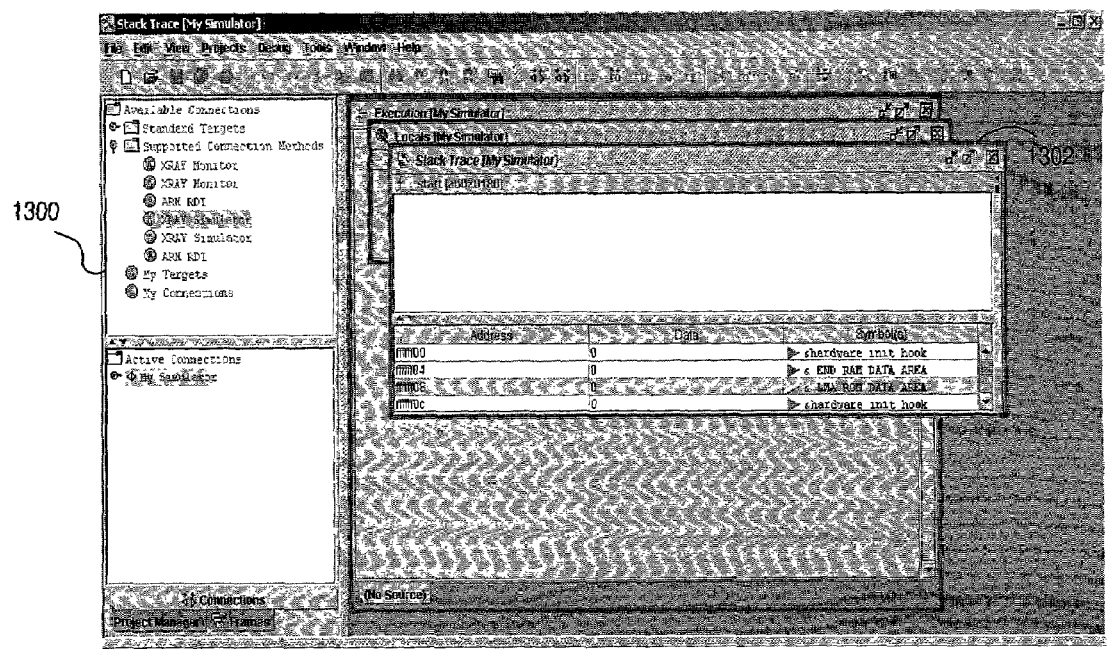

Referring to FIG. 11, stack trace window 1302 is generated when the debugging of the program begins. Stack trace window 1302 includes a sub-window associated with a "start" function.

Figure 12:
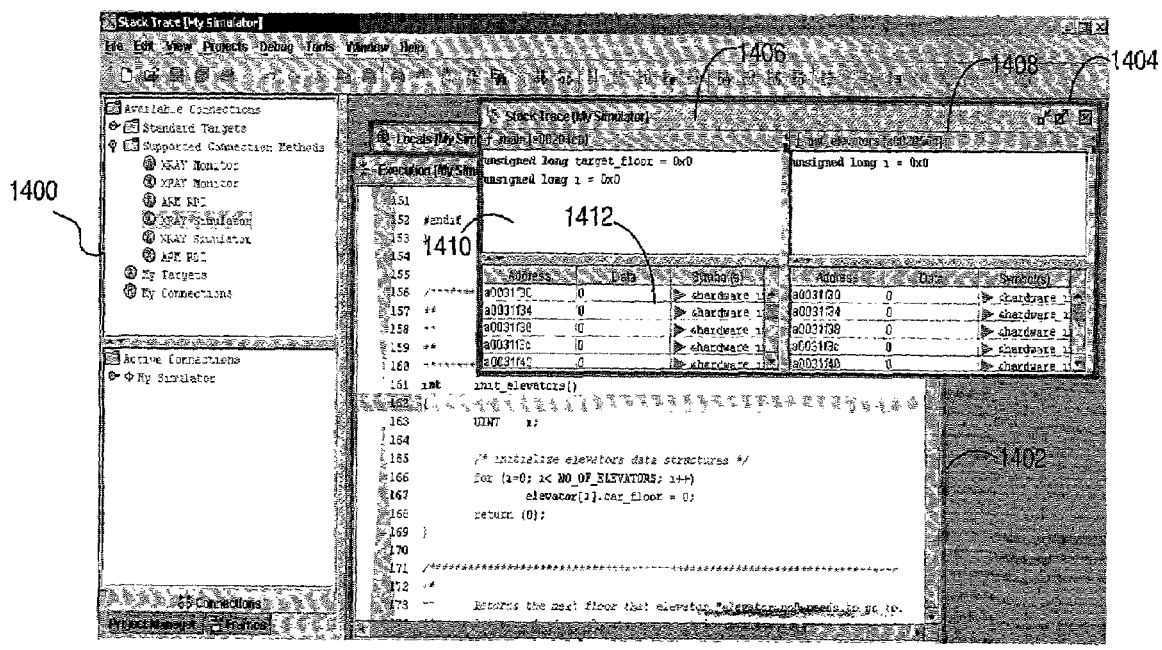

Referring to FIG. 12, window 1402 displays the source code of the program being debugged. Stack trace window 1404 provides stack information associated with a highlighted line of code in window 1402. Stack trace window 1404 includes two sub-windows 1406 and 1408 positioned next to each other to provide a horizontal arrangement of sub-windows within stack trace window 1404. Each sub-window displays stack data associated with a corresponding function and includes two display areas: a display area 1410 to present high-level stack data of the corresponding function and a display area 1412 to present low-level stack data of the corresponding function.

Figure 13:
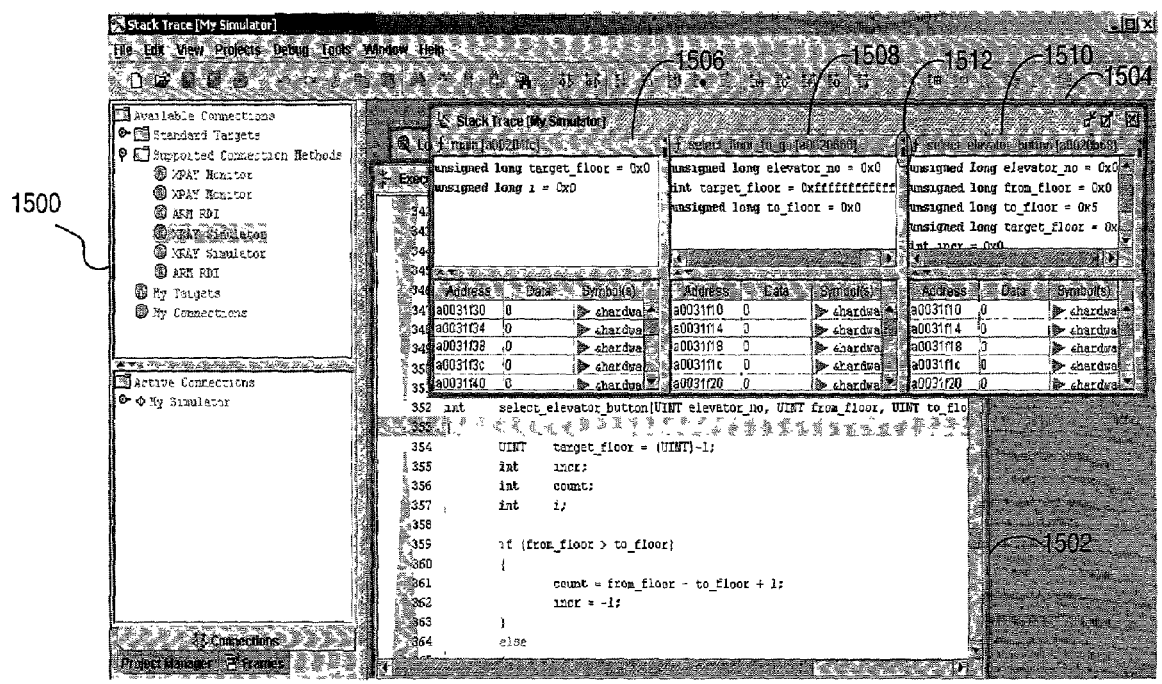

FIG. 13 illustrates the state of the debugging process after stepping further through the source code displayed in window 1502. At this state, stack trace window 1504 includes three sub-windows 1506, 1508 and 1512 that are arranged horizontally within stack trace window 1504. As described above, each sub-window includes two display areas for presenting low-level stack data and high-level stack data of a corresponding function. In addition, each sub-window provides symbols 1512 that represent a triangle and a rectangle. The triangle is designated to accept the user's command to close a sub-window and the rectangle is designated to accept the user's command to re-open a previously closed sub-window.

Figure 14:
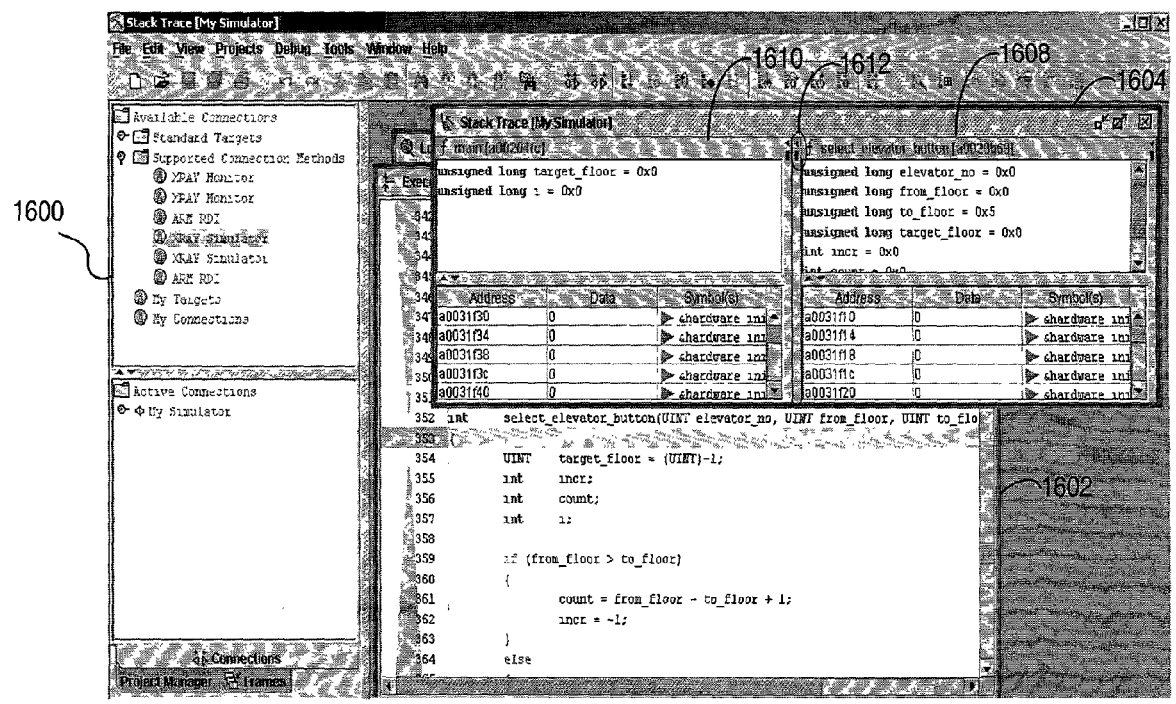

FIG. 14 illustrates a stack trace window 1604 after a middle sub-window has been closed. The user can use a rectangle symbol 1612 to re-open the middle sub-window when needed.

Figure 15:
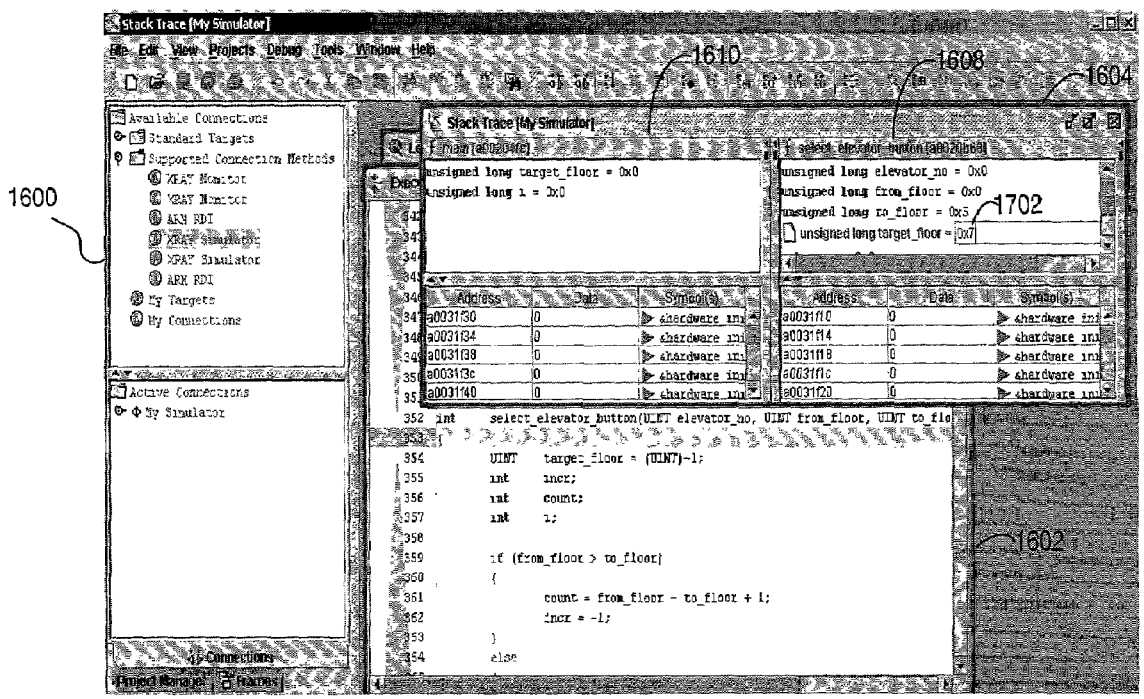

FIG. 15 illustrates editing of a local variable 1702 in a sub-window 1608 of a stack trace window 1604. The editing is performed after the user double-clicks on local variable 1702 causing a transition into an update mode. In the update mode, local variable 1702 is highlighted to indicate that the user can now replace the existing value of local variable 1702 with a new value.

A method and system for debugging a computer program have been described. The specific arrangements and methods described here are illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A method to debug a program, the method comprising:
presenting information pertaining to a first function executed within the program in a first sub-window of a stack window;
presenting information pertaining to a second function executed within the program in a second sub-window of the stack window, the second sub-window being positioned next to the first sub-window to provide a horizontal arrangement of the first and second sub-windows within the stack window; and
presenting information pertaining to a third function called by the second function in a third sub-window of the stack window, the third sub-window being positioned next to the second sub-window to provide a horizontal arrangement of the first, second and third sub-windows within the stack window.

2. The method of claim 1 wherein the third function is the first function recursively called by the second function.

3. The method of claim 1 wherein the information pertaining to each of the first and second functions includes a high-level stack data associated with said each of the first and second functions and a low-level stack data associated with said each of the first and second functions.

4. The method of claim 3 further comprising:
receiving a user command to provide additional information regarding a particular item within the high-level stack data;
finding the additional information in a stack; and
displaying the additional information in a corresponding sub-window.

5. The method of claim 4 wherein the user command includes clicking on an icon associated with the particular item, the icon indicating that the particular item can be expanded.

6. The method of claim 3 wherein the high-level stack data includes a set of variables associated with a corresponding function and a value stored in each of the set of variables during execution of the corresponding function.

7. The method of claim 3 wherein the low-level stack data includes a plurality of memory locations, data stored at each of the plurality of memory locations and a program symbol associated with said each of the plurality of memory locations.

8. The method of claim 7 further comprising:
displaying an indicator of multiple program symbols associated with said each of the plurality of memory locations; and
enabling a user to interact with the indicator using a cursor control device to view each of the multiple program symbols.

9. The method of claim 3 wherein the high-level stack data is displayed in a first display area within a corresponding sub-window and the low-level stack data is displayed in a second display area within the corresponding sub-window.

10. The method of claim 1 wherein the information pertaining to each of the first, second, and third functions includes a high-level stack data associated with said each of the first, second, and third functions and a low-level stack data associated with said each of the first, second, and third functions.

11. The method of claim 9 further comprising adjusting the size of the first display area based on a user interaction with a cursor control device.

12. The method of claim 1 further comprising adjusting the size of any one of the first and second sub-windows based on a user interaction with a cursor control device.

13. The method of claim 1 further comprising adjusting the size of any one of the first, second, and third sub-windows based on a user interaction with a cursor control device.

14. The method of claim 1 further comprising closing any one of the first and second sub-windows based on a user interaction with a cursor control device.

15. The method of claim 1 further comprising closing any one of the first, second, and third sub-windows based on a user interaction with a cursor control device.

16. The method of claim 1 further comprising:
updating any item within the information pertaining to any one of the first and second functions based on user input.

17. The method of claim 1 further comprising:
updating any item within the information pertaining to any one of the first, second, and third functions based on user input.

18. A system comprising:
a first means for presenting information pertaining to a first function executed within the program in a first sub-window of a stack window;
a second means for presenting information pertaining to a second function executed within the program in a second sub-window of the stack window, the second sub-window being positioned next to the first sub-window to provide a horizontal arrangement of the first and second sub-windows within the stack window; and
a third means for presenting information pertaining to a third function called by the second function in a third sub-window of the stack window, the third sub-window being positioned next to the second sub-window to provide a horizontal arrangement of the first, second and third sub-windows within the stack window.

19. The system of claim 18 wherein the information pertaining to each of the first and second functions includes a high-level stack data associated with said each of the first and second functions and a low-level stack data associated with said each of the first and second functions.

20. The system of claim 19 wherein the high-level stack data includes a set of variables associated with a corresponding function and a value stored in each of the set of variables during execution of the corresponding function.

21. The system of claim 19 wherein the low-level stack data includes a plurality of memory locations, data stored at each of the plurality of memory locations and a program symbol associated with said each of the plurality of memory locations.

22. The system of claim 19 wherein the high-level stack data is displayed in a first display area within a corresponding sub-window and the low-level stack data is displayed in a second display area within the corresponding sub-window.

23. The system of claim 22 further comprising:
a fourth means for adjusting the size of the first display area based on a user interaction with a cursor control device.

24. The system of claim 18 further comprising:
a fourth means for adjusting the size of any one of the first and second sub-windows based on a user interaction with a cursor control device.

25. The system of claim 18 further comprising:
a fourth means for closing any one of the first and second sub-windows based on a user interaction with a cursor control device.

26. The method of claim 18 further comprising:
a fourth means for updating any item within the information pertaining to any one of the first and second functions based on user input.

27. The system of claim 18 wherein the information pertaining to each of the first, second, and third functions includes a high-level stack data associated with said each of the first, second, and third functions and a low-level stack data associated with said each of the first, second, and third functions.

28. The system of claim 18 further comprising:
a fourth means for adjusting the size of any one of the first, second, and third sub- windows based on a user interaction with a cursor control device.

29. The system of claim 18 further comprising:
a fourth means for closing any one of the first, second, and third sub-windows based on a user interaction with a cursor control device.

30. The method of claim 18 further comprising:
a fourth means for updating any item within the information pertaining to any one of the first, second, and third functions based on user input.

31. A computer readable medium that provides instructions, which when executed on a processor, cause said processor to perform operations comprising:

presenting information pertaining to a first function executed within the program in a first sub-window of a stack window;

presenting information pertaining to a second function executed within the program in a second sub-window of the stack window, the second sub-window being positioned next to the first sub-window to provide a horizontal arrangement of the first and second sub-windows within the stack window; and presenting information pertaining to a third function called by the second function in a third sub-window of the stack window, the third sub-window being positioned next to the second sub-window to provide a horizontal arrangement of the first, second and third sub-windows within the stack window.

* * * * *